United States Patent Office 2,855,415
Patented Oct. 7, 1958

2,855,415

NEW STEROIDS AND METHODS FOR THEIR PRODUCTION

Harold Levy, Shrewsbury, Mass., assignor to G. D. Searle & Co., Chicago, Ill., a corporation of Delaware No Drawing. Application December 2, 1957
Serial No. 699,937

3 Claims. (Cl. 260—397.45)

The present invention relates to the 21-iodoacetates of hydrocortisone and of cortisone. The compounds can be represented by the structural formula

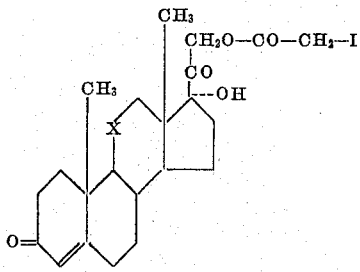

wherein X is a member of the class consisting of hydroxymethylene and carbonyl groups.

The compounds of this invention have valuable pharmaceutical properties. They have a selective inhibitory effect on the thymolytic activity of hydrocortisone but not on some of the desirable actions of that hormone. Thus they do not affect the anti-inflammatory activity. They also do not inhibit the glycogenitic effects of hydrocortisone.

This result is surprising because other haloacetates of hydrocortisone, such as the 21-chloroacetate, have thymolytic acivity at least equal at least to that of the unesterified hydrocortisone.

The invention will be described more fully in the following examples which are to be considered illustrative only and not as limiting the invention in spirit or in scope. In these examples quantities are indicated in parts by weight.

*Example 1*

A mixture of 2 parts of hydrocortisone, 4 parts of fused potassium acetate and 40 parts of chloroacetic anhydride are heated for 90 minutes in a 70–73° C. bath with stirring. The mixture is then cooled and ice and water are added. The precipitate is collected on a filter, washed with water and dried in a desiccator. On multiple recrystallizations from acetone and methanolacetone there is obtained hydrocortisone 21-chloroacetate melting at about 241–249.5° C.

To a solution of 1.1 parts of hydrocortisone 21-chloroacetate in 50 parts of acetone, 2.5 parts of sodium iodide are added. The mixture is heated for an hour at 75–80° C. Most of the acetone is blown off with a stream of nitrogen and the residual mixture is diluted with much water. The resulting precipitate is collected on a filter, washed with water and dried under vacuum. Repeated recrystallization from acetone yields hydrocortisone 21-iodoacetate melting at about 216–222° C.

*Example 2*

Substitution of 2 parts of cortisone for the hydrocortisone used in the preceding example yields the 21-iodoacetate of cortisone.

What is claimed is:
1. A member of the class consisting of the 21-iodoacetates of hydrocortisone and cortisone.
2. Hydrocortisone 21-iodoacetate.
3. Cortisone 21-iodoacetate.

No references cited.